US012646724B2

(12) United States Patent
Wood et al.

(10) Patent No.: US 12,646,724 B2
(45) Date of Patent: *Jun. 2, 2026

(54) PROTON-CONDUCTING CERAMIC FUEL CELL ARCHITECTURE

(71) Applicant: VERSA POWER SYSTEMS, LTD, Calgary (CA)

(72) Inventors: Anthony Wood, Calgary (CA); Zheng Tang, Calgary (CA); Tahir Joia, Calgary (CA)

(73) Assignee: VERSA POWER SYSTEMS, LTD, Calgary (CA)

( * ) Notice: Subject to any disclaimer, the term of this patent is extended or adjusted under 35 U.S.C. 154(b) by 30 days.

This patent is subject to a terminal disclaimer.

(21) Appl. No.: 18/242,047

(22) Filed: Sep. 5, 2023

(65) Prior Publication Data

US 2023/0420689 A1 Dec. 28, 2023

Related U.S. Application Data

(63) Continuation of application No. 17/942,468, filed on Sep. 12, 2022, now Pat. No. 11,777,105.

(Continued)

(51) Int. Cl.
H01M 4/88 (2006.01)
H01M 4/86 (2006.01)
(Continued)

(52) U.S. Cl.
CPC ....... H01M 4/8885 (2013.01); H01M 4/8621 (2013.01); H01M 4/8657 (2013.01);
(Continued)

(58) Field of Classification Search
None
See application file for complete search history.

(56) References Cited

U.S. PATENT DOCUMENTS 11,777,105 B2 * 10/2023 Wood .................. H01M 4/8889
429/479
2006/0024547 A1 2/2006 Waldbillig et al.
(Continued)

FOREIGN PATENT DOCUMENTS

CN 113140770 A 7/2021
DE 4206007 A1 * 9/1993 ............... B22F 3/10
(Continued)

OTHER PUBLICATIONS

DE4206007A1 English translation (Year: 1993).*
(Continued)

*Primary Examiner* — Mary Grace Byram
(74) *Attorney, Agent, or Firm* — Foley & Lardner LLP

(57) ABSTRACT

A method of manufacturing a proton-conducting fuel cell (PCFC) includes assembling a green anode-electrolyte half-cell. The green anode-electrolyte half-cell includes an electrolyte layer, an anode functional layer adjacent the electrolyte layer, an anode substrate layer adjacent the electrolyte layer, and a stress balancing layer adjacent the anode substrate layer. The method further includes sintering the green anode-electrolyte half-cell using solid state reaction sintering to form an anode-electrolyte half-cell.

20 Claims, 17 Drawing Sheets

Related U.S. Application Data

(60) Provisional application No. 63/244,054, filed on Sep. 14, 2021.

(51) Int. Cl.

| | |
|---|---|
| *H01M 8/10* | (2016.01) |
| *H01M 8/1213* | (2016.01) |
| *H01M 8/1226* | (2016.01) |
| *H01M 8/124* | (2016.01) |
| *H01M 8/1253* | (2016.01) |
| *H01M 8/12* | (2016.01) |

(52) U.S. Cl.
CPC ....... *H01M 4/8835* (2013.01); *H01M 4/8857* (2013.01); *H01M 4/8889* (2013.01); *H01M 8/10* (2013.01); *H01M 8/1213* (2013.01); *H01M 8/1226* (2013.01); *H01M 8/124* (2013.01); *H01M 8/1253* (2013.01); *H01M 2004/8684* (2013.01); *H01M 2008/1293* (2013.01)

(56) References Cited

U.S. PATENT DOCUMENTS

| | | | |
|---|---|---|---|
| 2006/0093887 | A1 | 5/2006 | Nammensma et al. |
| 2014/0272665 | A1 | 9/2014 | Yoon et al. |
| 2016/0036064 | A1* | 2/2016 | Tong ................... H01M 4/8892 264/618 |
| 2018/0205105 | A1* | 7/2018 | Takeuchi ............ H01M 4/8668 |
| 2020/0136150 | A1* | 4/2020 | Liu ..................... H01M 4/9025 |
| 2021/0257642 | A1 | 8/2021 | Wood et al. |

FOREIGN PATENT DOCUMENTS

| | | | | |
|---|---|---|---|---|
| KR | 10-2012-0040384 | A | 4/2012 | |
| KR | 101154506 | B1 | 6/2012 | |
| KR | 101439176 | B1 * | 9/2014 | .......... H01M 4/8889 |
| WO | WO-2022/114843 | A1 | 6/2022 | |

OTHER PUBLICATIONS

KR101154506B1 English translation (Year: 2012).*

Machine English translation of KR 101439176 B1 originally published to Lee Sep. 17, 2014 (Year: 2014).*

Braun et al., Development of kW-scale Protonic Ceramic Fuel Cells and Systems, ECS Transactions, 91 (1) 997-1008 (2019) (Year: 2019).

International Search Report and Written Opinion for PCT Appl. Ser. No. PCT/US2022/043189 dated Jun. 13, 2024 (21 pages).

Skrzypkiewicz et al; Influence of the Contamination of Fuel with Fly Ash Originating from Biomass Gasification on the Performance of the Anode-Supported SOFC. Energies. 2022; 15(4):1469. https://doi.org/10.3390/en15041469.

Tong et al. Solid-state reactive sintering mechanism for large-grained yttrium-doped barium zirconate proton conducting ceramics, J. Mater. Chem., 2010, 20, 6333-6341, https://doi.org/10.1039/C0JM00381F.

Xiao, Guoliang et al., Redox stable anodes for solid oxide fuel cells, Review article, Front. Energy Res., Jun. 6, 2014, Sec. Fuel Cells, Electrolyzers and Membrane Reactors, vol. 2—2014 https://doi.org/10.3389/fenrg.2014.00018.

\* cited by examiner 130
120
110

100a 130
120
110
140

100b

Cathode Layer
Electrolyte Layer
Anode Functional Layer

Anode Substrate Layer

Stress Balancing Layer

Cathode Layer

Electrolyte Layer

Anode Functional Layer

Anode Substrate Layer

Stress Balancing Layer

Anode Substrate Layer

Stress Balancing Layer

Coarse NiO Layer

PROTON-CONDUCTING CERAMIC FUEL CELL ARCHITECTURE

CROSS-REFERENCE TO RELATED PATENT APPLICATIONS

The present application is a continuation of U.S. patent application Ser. No. 17/942,468, filed Sep. 12, 2022, which claims the benefit of and priority to U.S. Provisional Patent Application No. 63/244,054, filed Sep. 14, 2021, both of which are hereby incorporated herein by reference in their entireties.

STATEMENT OF GOVERNMENT RIGHTS

This invention was made with Government Support under Cooperative Agreement DE-AR0000493 awarded by the United States Department of Energy. The Government has certain rights in the invention.

BACKGROUND

The present application relates generally to the field of proton-conducting ceramic fuel cell (PCFC) systems and, more particularly, the manufacture of PCFC systems at a commercially viable size and cost.

Generally, a fuel cell includes an anode, a cathode, and an electrolyte layer that together drive chemical reactions to produce electricity. Specifically, a PCFC is a solid electrochemical cell comprising a ceramic electrolyte sandwiched between a porous anode and porous cathode. Fuel, such as hydrogen gas or hydrocarbon gas, is supplied to the anode. The anode causes the hydrogen atom electrons to dissociate from the hydrogen protons. The protons travel across the proton-conducting electrolyte to the cathode, where they bond to oxidants, such as oxygen gas. The electrons travel through an external circuit from the anode to the cathode to generate electric power.

PCFC systems may be preferable to Solid Oxide Fuel Cell (SOFC) systems in certain circumstances, because they can provide enhanced performance at lower operating temperatures, resulting in lower operating costs and fewer material compatibility challenges. While SOFCs generally operate at temperatures in the range of 600-1000° C., PCFCs can provide good performance under 600° C.

PCFCs are traditionally manufactured using high-temperature calcination and sintering processes that require relatively long processing times, which in turn can contribute to a relatively high production cost. Additionally, prior PCFC production techniques that utilized solid state reaction sintering (SSRS) presented issues such as bonding of the materials to kiln furniture and/or warpage of the parts due to high shrinkage compared to conventional sintering processes. Accordingly, it would be advantageous to develop a PCFC manufacturing process that allows for cells of commercially viable size to be manufactured using a lower-temperature sintering process.

SUMMARY

In some embodiments of the present disclosure, a method of manufacturing a PCFC includes assembling a green anode-electrolyte half-cell by forming an anode substrate layer having an upper surface and a lower surface, forming an anode functional layer on the upper surface of the anode substrate layer, forming an electrolyte layer on an upper surface of the anode functional layer, and forming a stress balancing layer on the lower surface of the anode substrate layer. The method further includes positioning the green anode-electrolyte half-cell on kiln furniture inside a sintering kiln and sintering the green anode-electrolyte half-cell using SSRS to an anode-electrolyte half-cell.

In some aspects of the method, the method further comprises forming a cathode layer on an upper surface of the electrolyte and cathode sintering the anode-electrolyte half-cell and cathode layer.

In some aspects, the assembling of the green anode-electrolyte half-cell further comprises forming a coarse NiO layer on a lower surface of the stress balancing layer such that, when the green anode-electrolyte half-cell is positioned on the kiln furniture, the stress balancing layer does not directly contact the kiln furniture. In some aspects the coarse NiO layer may comprise NiO powder with average particle size above about 20 micrometers and below about 2.0 mm. The NiO powder may have an average particle size of about 60 micrometers.

In some aspects, the coarse NiO layer may be brushed off after sintering. In other aspects, the coarse NiO layer may be reduced to nickel metal by operating the PCFC.

In some aspects, the method may include forming a layer of coarse NiO paste on the kiln furniture such that the anode-electrolyte half-cell is not in contact with the kiln furniture. In some aspects, the method may include placing a sheet of yttria paper between the anode-electrolyte half-cell and the kiln furniture such that the anode-electrolyte half-cell is not in contact with the kiln furniture.

In other embodiments of the present disclosure, a PCFC is provided which comprises an anode substrate layer comprising an upper surface and a lower surface, an anode functional layer coupled to the upper surface of the anode substrate layer, an electrolyte layer coupled to an upper surface of the anode functional layer, and a stress balancing layer coupled to the lower surface of the anode substrate layer.

In some aspects, the PCFC further comprises a cathode layer coupled to an upper surface of the electrolyte layer.

In some aspects, the PCFC further comprises a coarse NiO layer coupled to a lower surface of the stress balancing layer. In some aspects, the PCFC includes a layer of nickel metal coupled to a lower surface of the stress balancing layer, the layer of nickel metal formed by heating a layer of coarse NiO In some aspects, the stress balancing layer may be more than about 5um thick and less than about 100 micrometers thick.

In other embodiments of the present disclosure, a PCFC is provided which comprises an anode substrate layer comprising an upper surface and a lower surface, an anode functional layer coupled to the upper surface of the anode substrate layer, an electrolyte layer coupled to an upper surface of the anode functional layer, and a coarse NiO layer forming a lower surface of the proton-conducting fuel cell.

In some aspects, the coarse NiO layer may comprise NiO powder with an average particle size above about 20 micrometers and below about 2.0 mm, and preferably about 60 micrometers.

It will be appreciated that these and other features and/or aspects maybe used in any combination.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1A:
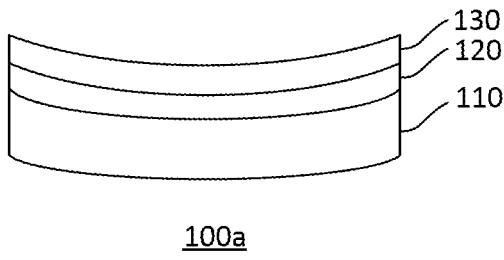
FIG. 1A is a schematic representation of a typical PCFC anode-electrolyte half-cell that has warped during a conventional SSRS process.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

PCFCs may be manufactured using a lower temperature sintering process through the use of solid-state reactive sintering (SSRS). The use of SSRS allows for the sintering of anode-electrolyte half-cells at temperatures of about 1450° C. or less, compared to temperatures as high as 1700° C. for traditional PCFC sintering.

Production of PCFCs using SSRS includes a first solid-state reactive sintering of the anode-electrolyte half-cell containing a thin layer of anode substrate, an anode functional layer, and an electrolyte layer. During the SSRS step, the anode substrate layer, generally the bottom layer, may be placed directly on the kiln furniture inside the sintering kiln. The layers bond during SSRS process to form the half-cell. PCFC fabrication may be completed by screen printing a layer of cathode onto the upper surface of the electrolyte layer and conventionally sintering the cell a second time at a lower temperature, about 800-1000° C., a process called cathode sintering.

While the SSRS method has been successful in producing small test cells, or button cells, fabrication of PCFCs at a commercially viable size—about 81 cm$^2$ active electrode area or larger—poses additional problems. First, fuel cells sintered using SSRS shrink up to 1.5 times as much as conventionally sintered cells, causing the cell to warp during processing due to the inconsistent shrink rates in the layers. Second, the carbonates and oxides used to produce the barium zirconates in the anode substrate layer, which is in contact with the furniture inside the sintering kiln, react strongly with the kiln furniture material, generally zirconia or silicon carbide. The reaction with the kiln furniture causes the half-cells to deform and break due to the large surface area in contact with the kiln furniture. For smaller button cells, an additional layer of electrolyte can be bonded to the lower surface of the anode substrate, i.e. the surface opposite the anode functional layer. This layer can be ground off after sintering to expose the anode substrate for use in a test cell. Because there is less shrinkage due to the size of the button cells, the reaction between the half-cell and the kiln furniture is less likely to be destructive. However, this solution is not viable for larger cells because of the larger contact area between the half-cell and the kiln furniture.

The present disclosure discusses the production of PCFCs that contain a stress balancing layer coupled to the bottom surface of the anode substrate layer as well as methods of fabricating such a PCFC. Various fabrication methods include steps to prevent the reaction of the anode substrate with the sintering kiln furniture using a coarse layer of NiO paste or a sheet of yttria paper between the half-cell and kiln furniture. These methods overcome previous limitations which prevented the production of PCFCs of commercially viable size due to the PCFC warping during sintering and bonding to the kiln furniture, causing deformation and breakage.

PCFCs made according to the embodiments described herein have demonstrated peak power densities of about 521 mW/cm$^2$ when tested at an operating temperature of 550° C., which is more than double the power density of typical solid oxide fuel cells at that relatively low temperature.

FIG. 1A is a representation of a typical PCFC anode-electrolyte half-cell 100$a$ that does not include a stress balancing layer. The half-cell 100$a$ shown has warped during sintering due to the lack of a stress balancing layer. The anode substrate layer 110 is formed from the anode substrate base material, generally a mixture of barium and zirconium oxides and/or carbonates and nickel oxide, which is combined with binders and solvents to form a paste. The paste is then laid out in a thin (between approximately 0.2 and 2.0 millimeters (mm)) layer, typically using tape casting, and dried. Note that the various ceramic materials that make up the completed cell are in the form of oxide and carbonate precursors of the ceramic components prior to sintering, and form barium zirconate ceramics during the sintering process. Next, the anode functional layer 120 is formed from the anode functional layer 120 base material, which is mixed with binders and solvents to form a paste and screen printed, doctor bladed, or painted onto the dried anode substrate layer 110. The anode functional layer 120 is generally a mixture of a barium and zirconium oxides and/or carbonates and NiO with a thickness of between approximately 5 and 50 micrometers. Finally, the electrolyte layer 130 is formed from the electrolyte base material, which is combined with binders and solvents to form a paste and screen printed, doctor bladed, or painted onto the dried anode functional layer 120. The electrolyte layer 130 is generally a mixture of barium and zirconium oxides and/or carbonates having a thickness of between approximately 5 and 50 micrometers. These layers are sintered together using SSRS to form the PCFC anode-electrolyte half-cell 100$a$ containing an anode substrate layer 110, an anode functional layer 120, and an electrolyte layer 130. A cathode layer may then be sintered to the half-cell 100$a$ on top of the electrolyte layer 130 at lower temperatures in a separate step to complete the cell.

During sintering, anode-electrolyte half-cells shrink as the base materials densify into ceramic. To fabricate an ideal anode-electrolyte half-cell, the electrolyte layer 130 is sintered to a fully dense state, while the anode functional layer 120 is slightly more porous with a fine microstructure, and the anode substrate layer 110 is even more porous with a coarser microstructure. Thus, the electrolyte layer 130 experiences the most shrinkage, the anode functional layer 120 slightly less shrinkage, and the anode substrate layer 110 the least shrinkage.

Due to the differing rates of shrinkage, as well as temperature differentials in the half-cell and differences in the stress state in the middle of the half-cell (fully constrained) compared to the edges of the cell (partially constrained), half-cells can warp during sintering, as shown in FIG. 1A. Compared to a traditional fuel cell sintering process, there is additional chemical shrinkage during SSRS as the carbonates and oxides are converted into the final perovskite phase. While excessive shrinkage does not have a strong effect on small button cells made using SSRS, large-area, thin half-cells that are required for commercial PCFC operation may be so warped as to require multiple time-consuming and expensive ironing steps, or may be entirely unusable.

Figure 1B:
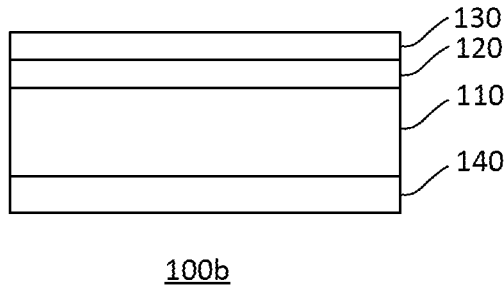
FIG. 1B is a schematic representation of a PCFC anode-electrolyte half-cell including a stress balancing layer, according to an exemplary embodiment.
Figure 9:
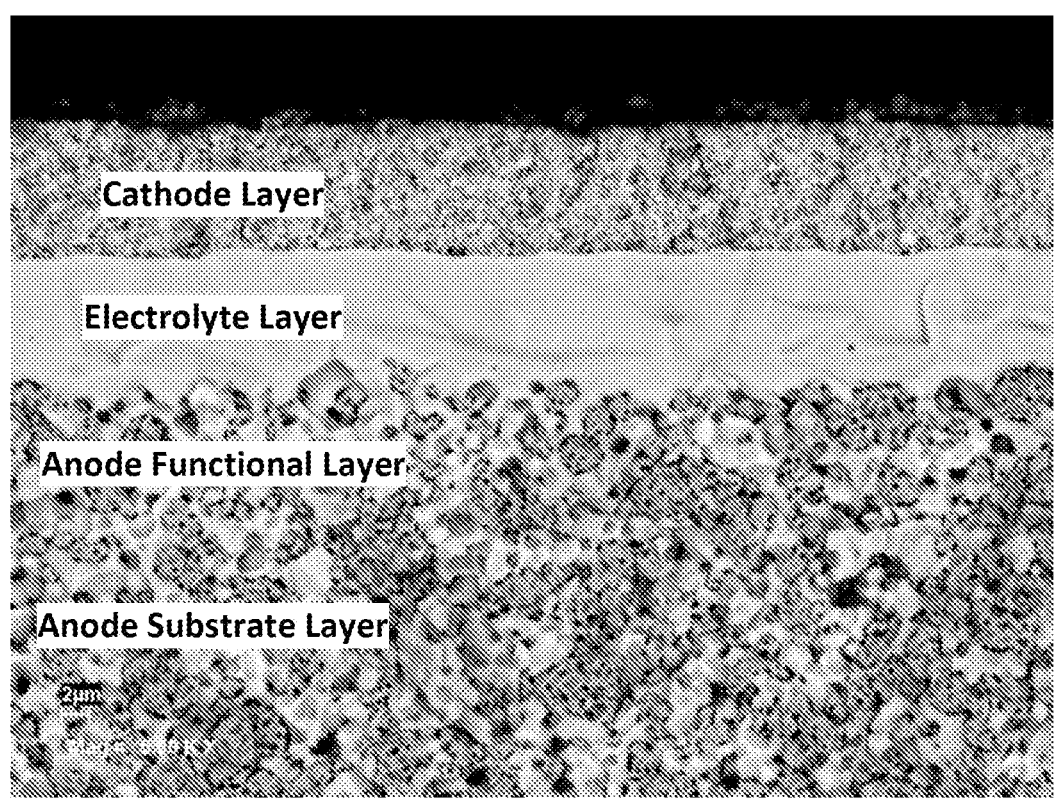
FIG. 9 is an SEM image of a cross-section of the upper layers of a PCFC according to an exemplary embodiment.

FIG. 1B is a representation of an exemplary embodiment of a PCFC anode-electrolyte half-cell 110$b$ that includes a stress balancing layer 140. The stress balancing layer 140 is made from a material similar to that of the anode functional layer 120 and may be between approximately 5 and 100 micrometers thick. In some embodiments, the stress balancing layer 140 may be approximately the same thickness as the anode functional layer 120. The stress balancing layer 140 is formed from the stress balancing layer base material, a material similar to or the same as the anode functional layer base material, which is combined with binders and solvents to form a paste and screen printed, doctor bladed, or painted on to the lower surface of the anode substrate layer 110, i.e. the surface opposite the anode functional layer 120. The stress balancing layer 140 roughly matches the rate of shrinkage of the anode functional layer 120 and electrolyte layer 130, preventing or reducing the amount of warping in the PCFC during SSRS by balancing the mismatched shrinkage rates between the anode substrate layer 110, the anode functional layer 120, and electrolyte layer 130. After the anode-electrolyte half-cell 100$b$ is fabricated according to the various embodiments described herein, a complete PCFC may be fabricated by applying a cathode layer to the upper surface of the electrolyte layer 130 (i.e., the surface opposite the anode functional layer 120), and sintering again at a lower temperature in the range of between approximately 800 and 1000 degrees Celsius. This step is called cathode sintering. FIG. 9 illustrates the microstructure of a cathode layer after it has been sintered to an anode-electrolyte half-cell.

Figure 1C:
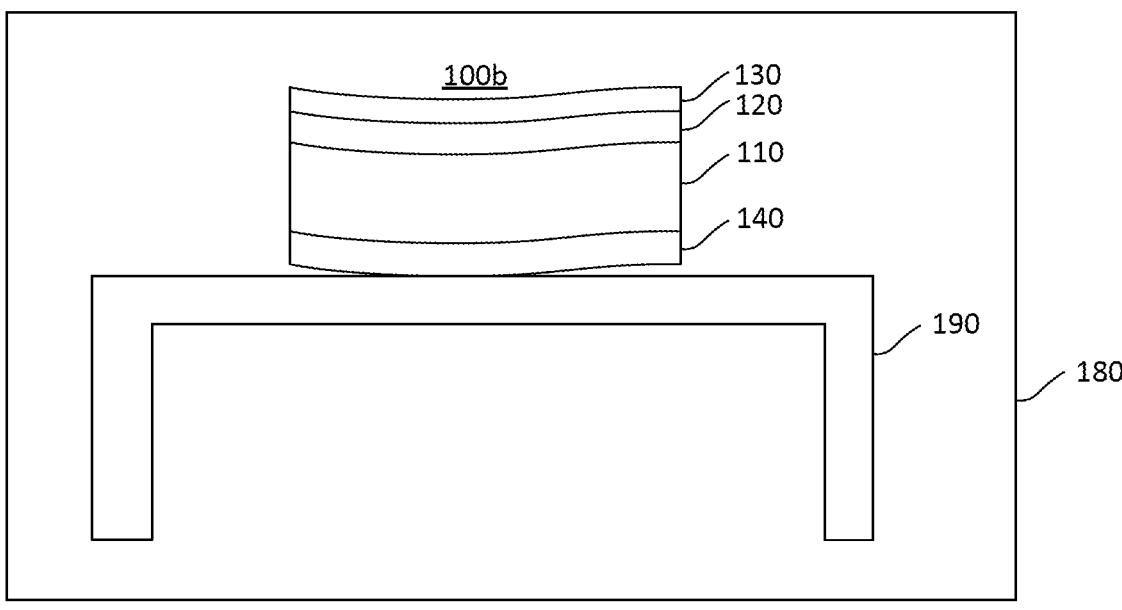
FIG. 1C is a schematic representation of a PCFC anode-electrolyte half-cell on kiln furniture inside a sintering kiln during a conventional SSRS process that has warped due to the cell materials reacting with the kiln furniture.

FIG. 1C shows a PCFC anode-electrolyte half-cell 100$b$, including a stress balancing layer 140 as described above, on the kiln furniture 190 inside the sintering kiln 180. The stress balancing layer 140 is in direct contact with the kiln furniture 190, with the anode substrate layer 110 on top of the stress balancing layer 140, the anode functional layer 120 on top of the anode substrate layer 110 and the electrolyte layer 130 on top of the anode functional layer 120. The direct contact of the half-cell 100$b$ with the kiln furniture 190 may cause the stress balancing layer 140 to react with and bond to the kiln furniture 190 during sintering. This may cause the half-cell 100$b$ to warp and/or crack, which may require the half-cell 100$b$ to be ironed flat prior to use or may render the half-cell 100$b$ unusable altogether. In a half-cell with no stress balancing layer (e.g., half-cell 100$a$), the anode substrate layer 110 may be in direct contact with the kiln furniture 190 during firing and may similarly react with the kiln furniture 190. Thus, separation between the stress balancing layer 140 or anode substrate layer 110 and the kiln furniture 190 may be required to prevent or reduce the amount of warping and cracking of the half-cell.

A layer of appropriate material between the kiln furniture and the half-cell may be used to prevent the cell materials from reacting with the kiln furniture. Kiln furniture is generally made of zirconia or silicon carbide which can withstand the extreme temperatures inside the sintering kiln. The material used to prevent the cell materials from reacting with and bonding to the kiln furniture must also be able to withstand these temperatures. In order to overcome the cell materials' reacting with and bonding to the kiln furniture, extensive experimentation was done with various materials placed between the kiln furniture and the cell. Some of the materials tested include zirconia foam, zirconia plate, zirconia fiber paper, dense alumina plate, porous alumina plate, alumina fiber paper, silicon carbide plate, and NiO powder finer than 20 micrometers. In each case, the cell either still reacted with the kiln furniture, reacted with the test material, cracked, warped, or was completely destroyed. Two solutions were eventually discovered: (i) a layer of coarse NiO powder paste applied between the half-cell and the kiln furniture, either on the kiln furniture, on the cell itself, or both, and (ii) yttria paper placed between the half-cell and the kiln furniture.

Figure 1D:
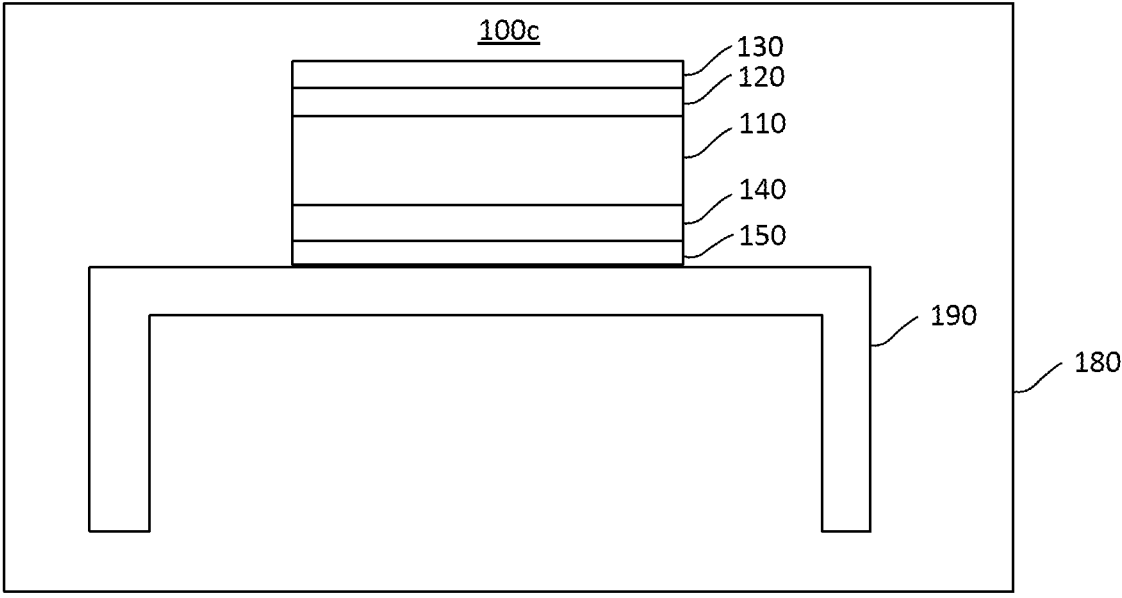
FIG. 1D is a schematic representation of a PCFC anode-electrolyte half-cell, including a coarse NiO layer, on kiln furniture inside a sintering kiln during the SSRS process.

FIG. 1D shows a PCFC anode-electrolyte half-cell 100c with a coarse NiO layer 150 according to an embodiment of the present disclosure. The coarse NiO layer 150 is formed from the coarse NiO layer base material, coarse NiO powder with an average particle size above about 20 micrometers and below about 2.0 mm, which is combined with binders and solvents to form a paste. In one successful test cell according to an exemplary embodiment, the average particle size of the NiO powder was about 60 micrometers. The coarse NiO layer paste loosely sinters during SSRS and forms a coarse microstructured layer, and prevents or reduces the reaction between the kiln furniture and the oxides and carbonates used to make barium zirconates of the half-cell. The coarse NiO particles of the coarse NiO layer 150 do not bond or react strongly with the kiln furniture. Thus, the coarse NiO layer 150 prevents or reduces warpage and cracking of the half-cell 100c due to reactions with the kiln furniture and the stress balancing layer 140 prevents or reduces warpage due to mismatched shrink rates.

Figure 8:
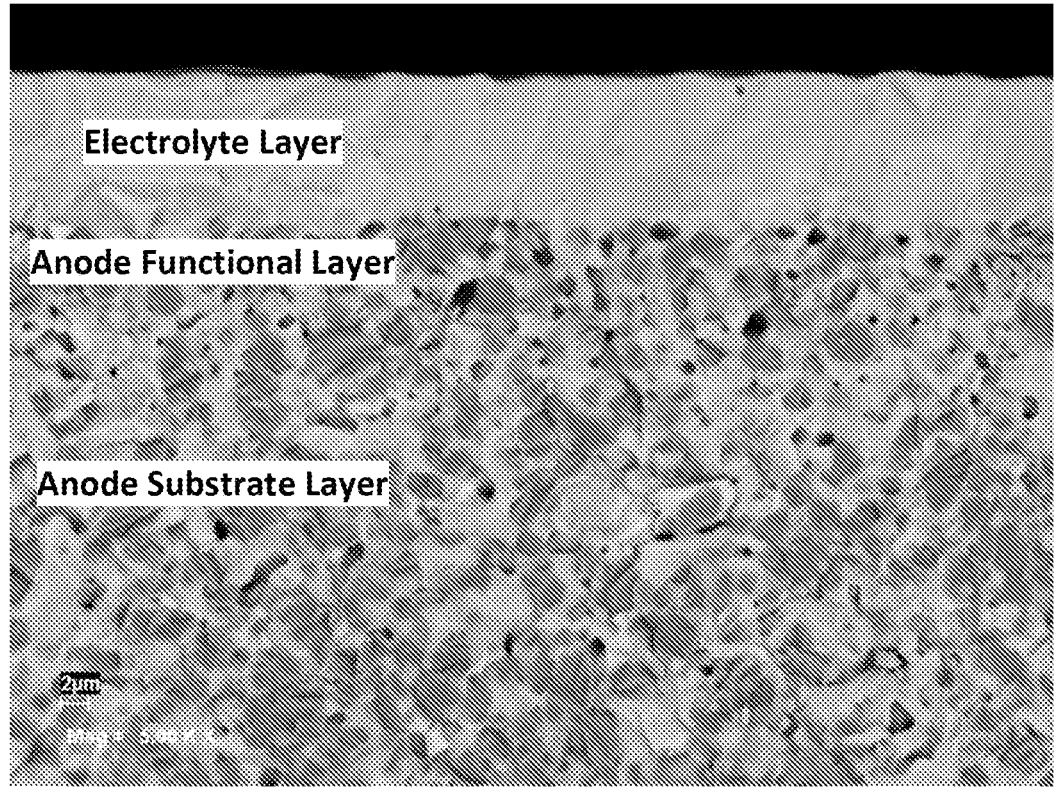
FIG. 8 is a scanning electron microscope (SEM) image of a cross-section of the upper layers of a PCFC anode-electrolyte half-cell according to an exemplary embodiment.
Figure 10:
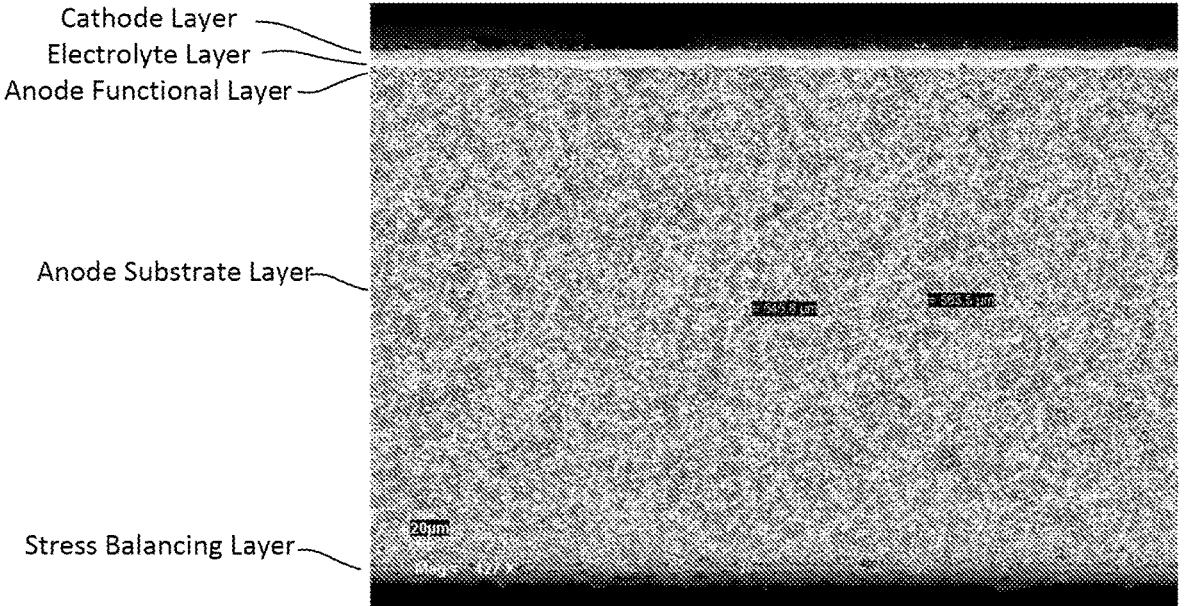
FIG. 10 is an SEM image of a cross-section of a PCFC containing a stress balancing layer according to an exemplary embodiment.
Figure 11:
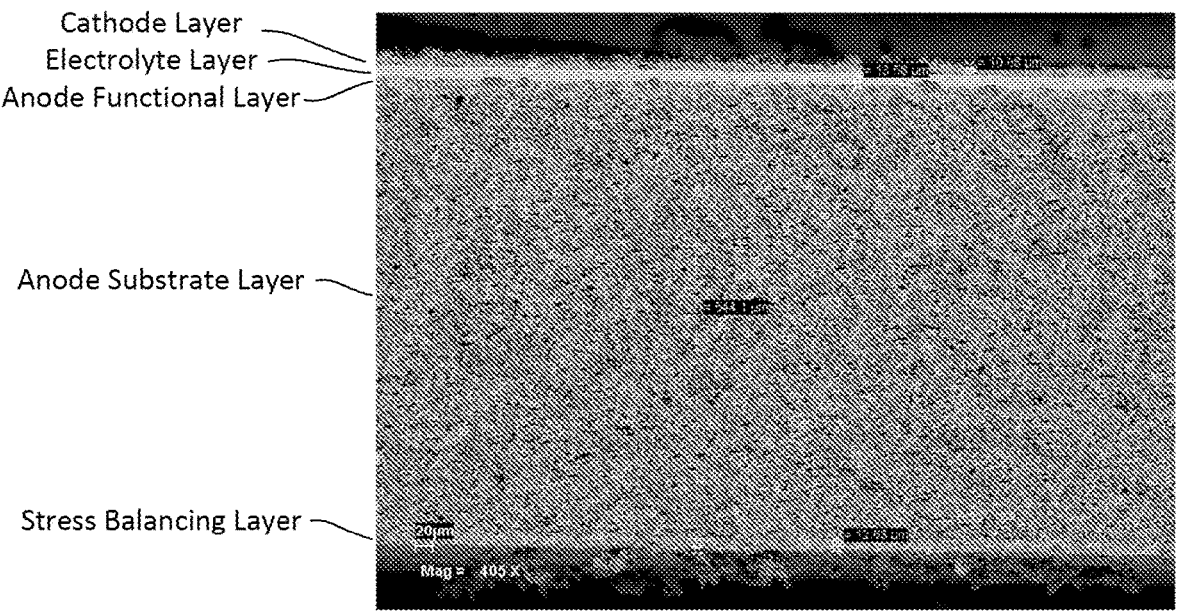
FIG. 11 is an SEM image of a cross-section of a PCFC containing a stress balancing layer according to an exemplary embodiment.
Figure 12:
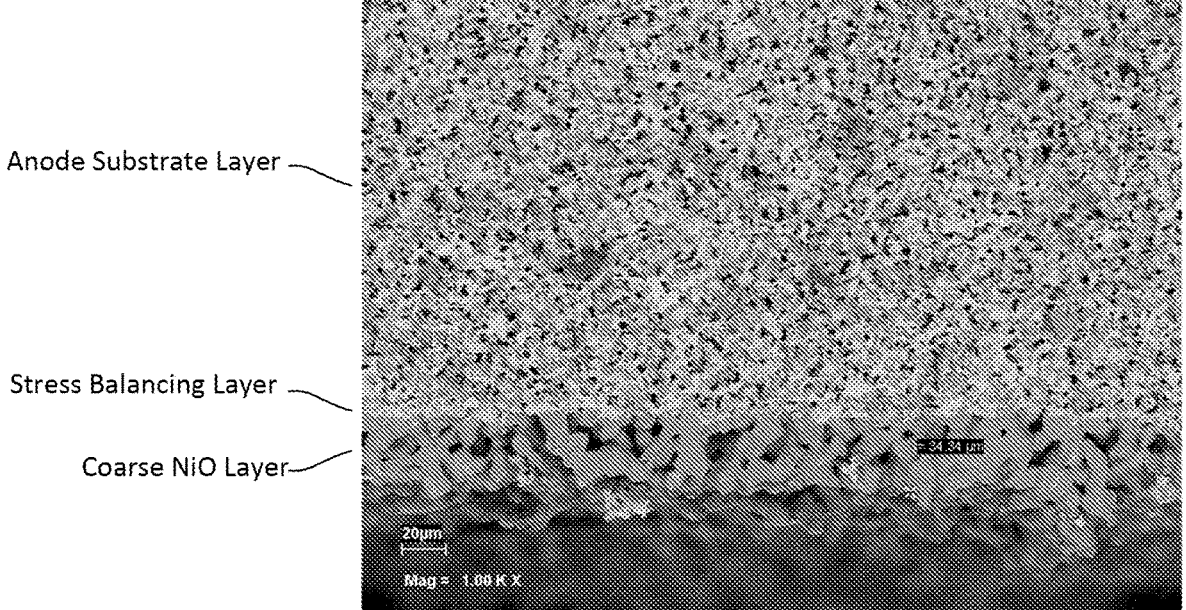
FIG. 12 is an SEM image of a cross-section of the lower layers of a PCFC containing a stress balancing layer and a coarse NiO layer according to an exemplary embodiment.

FIG. 8 is an image from a scanning electron microscope showing the microstructure of a cross-section of the upper layers of a PCFC anode-electrolyte half-cell manufactured with a stress-balancing layer (e.g., stress balancing layer 140) and a sacrificial layer (e.g., coarse NiO layer 150 that may be removed or converted to nickel metal) according to an exemplary embodiment. The stress-balancing layer and sacrificial layer have prevented the half-cell from warping or cracking. FIG. 9 is an image from a scanning electron microscope showing the microstructure of the upper layers of a PCFC after a cathode layer has been sintered to an anode-electrolyte half-cell according to an exemplary embodiment. FIGS. 10 and 11 are images from a scanning electron microscope showing the microstructure of a PCFC with a stress-balancing layer according to an exemplary embodiment. FIG. 12 is an image from a scanning electron microscope showing the microstructure of the lower layers of a PCFC with a stress-balancing layer and a sacrificial layer according to an exemplary embodiment.

Figure 2:
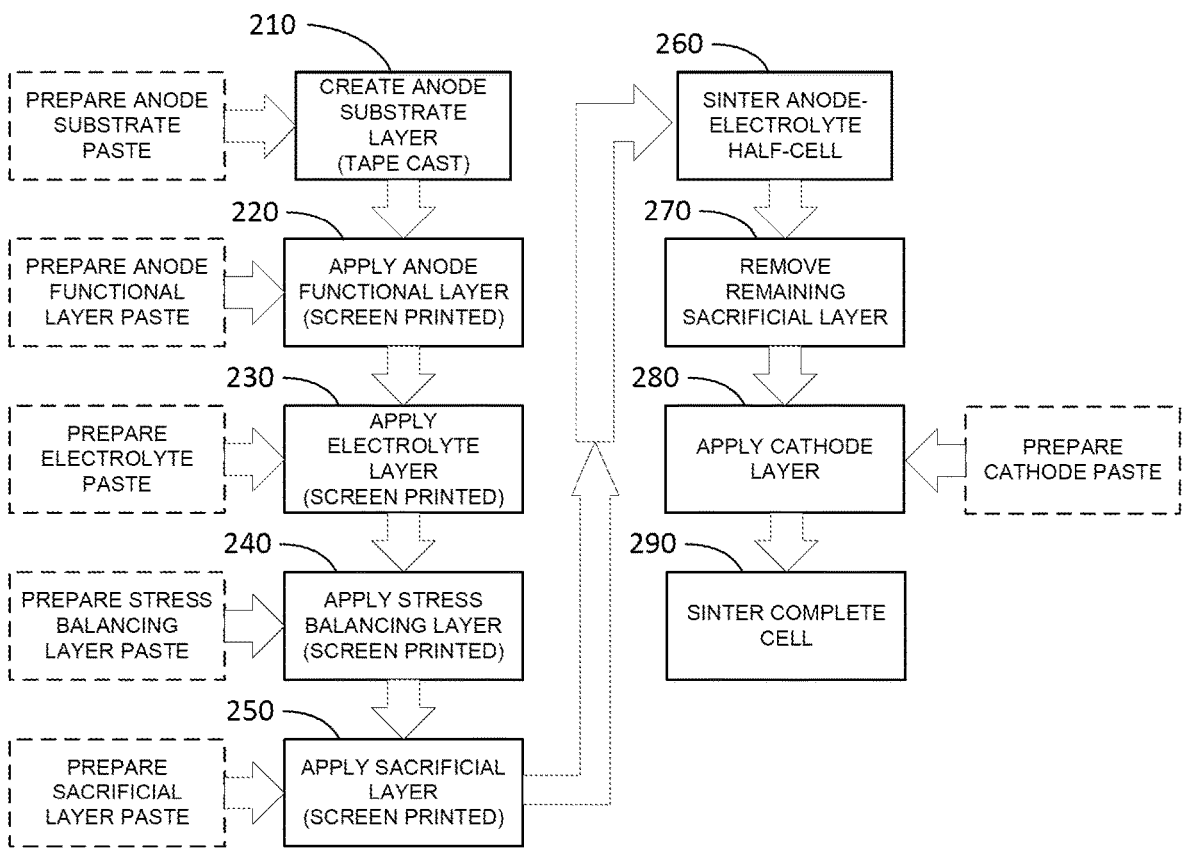
FIG. 2 illustrates flow diagram of an exemplary embodiment of preparing a PCFC anode-electrolyte half-cell.

Various embodiments of the present disclosure include methods of producing PCFCs as described above. FIG. 2 illustrates an embodiment of a method of producing a PCFC of commercially viable size. At step 210, anode substrate paste is tape cast or otherwise deposited to form the anode substrate layer 110. At step 220, anode functional layer paste is screen printed or otherwise applied onto the top of the anode substrate layer 110 to form the anode functional layer 120. At step 230, electrolyte paste is screen printed or otherwise applied onto the top of the anode functional layer 120 to form the electrolyte layer 130. At step 240, stress balancing layer paste is screen printed or otherwise applied onto the bottom of the anode substrate layer 110 to form the stress balancing layer 140. As described above, the stress balancing layer 140 is coupled to the anode substrate to prevent or reduce bowing, warping, and cracking of the half-cell 100c during sintering. At step 250, coarse NiO layer paste is screen printed or otherwise applied onto the bottom surface of the stress balancing layer 140 (i.e., the surface opposite the anode substrate layer 110) to form the coarse NiO layer 150. These layers form a green half-cell that may not warp due to mismatched shrinkage rates or due to reaction with the kiln furniture 190 during sintering. In other exemplary embodiments, steps 210-250 may be completed in different orders. For example, the stress balancing layer 140 may be applied to the bottom of the anode substrate layer 110 before the anode functional layer 120 and electrolyte layer 130 are applied.

At step 260 in FIG. 2, the green half-cell is sintered in a sintering kiln 180 using SSRS at approximately 1450° C. to form the half-cell 100c containing a stress balancing layer 140 and a coarse NiO layer 150. The arrangement of the half-cell 100c during the sintering step 260 is shown in FIG. 1D. The coarse NiO layer 150 is a coarse layer of NiO loosely coupled to the stress balancing layer 140. At step 270, the coarse NiO layer is manually brushed off of or otherwise removed from the half-cell 100c. At step 280, the cathode paste is screen printed or otherwise applied onto the top surface of the electrolyte layer 130, i.e. the surface opposite the anode functional layer 120, to form the cathode layer. At step 290, the cell is sintered again with the cathode layer at a lower temperature such as 900° C. (cathode sintering) to form the completed PCFC.

In other exemplary embodiments, the coarse NiO layer 150 may be designed such that it remains attached to the cell. During PCFC operation, the coarse NiO layer 150 that remains attached may be reduced to nickel metal, which may be conductive and compatible with the other cell materials and may not interfere with the operation of the cell.

Figure 3A:
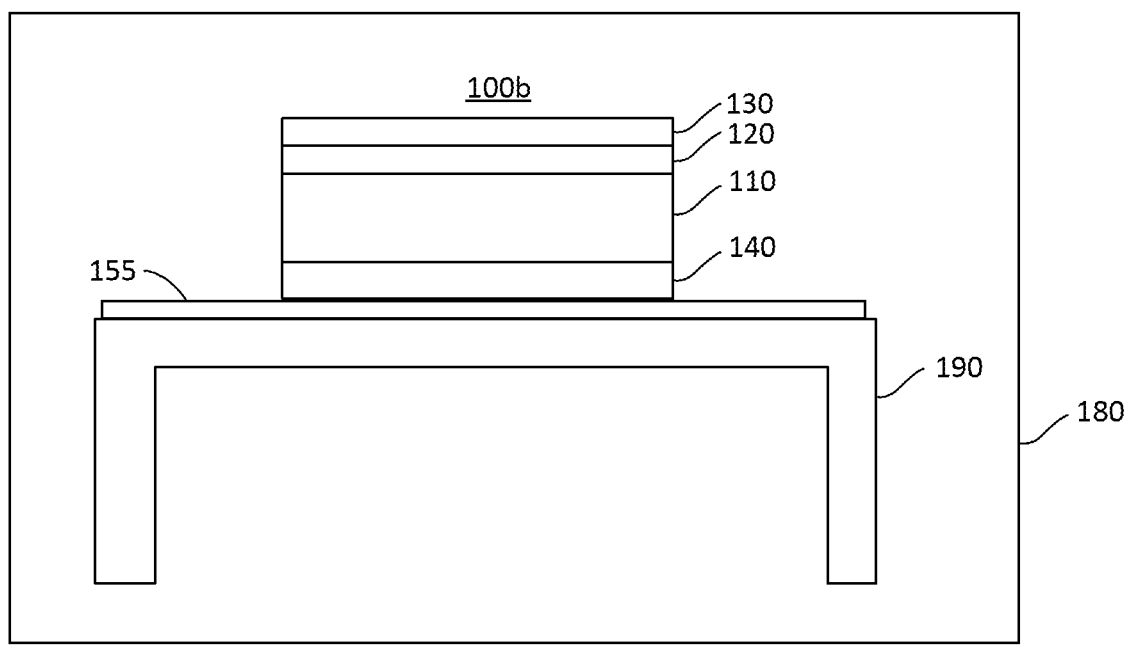
FIG. 3A is a schematic representation of a PCFC anode-electrolyte half-cell on kiln furniture inside a sintering kiln during the SSRS process with a layer of coarse NiO paste applied to the kiln furniture.

In some embodiments, as shown in FIG. 3A, a layer of coarse NiO paste 155 may be applied directly to the kiln furniture 190 rather than to the half-cell. After sintering, the NiO layer on the kiln furniture 190 is generally reduced to a loose powder bed. The NiO can be swept up and reprocessed into a paste for subsequent firings. Some of the NiO that was applied to the kiln furniture 190 may bond to the PCFC after firing, and can be manually brushed off.

Figure 3B:
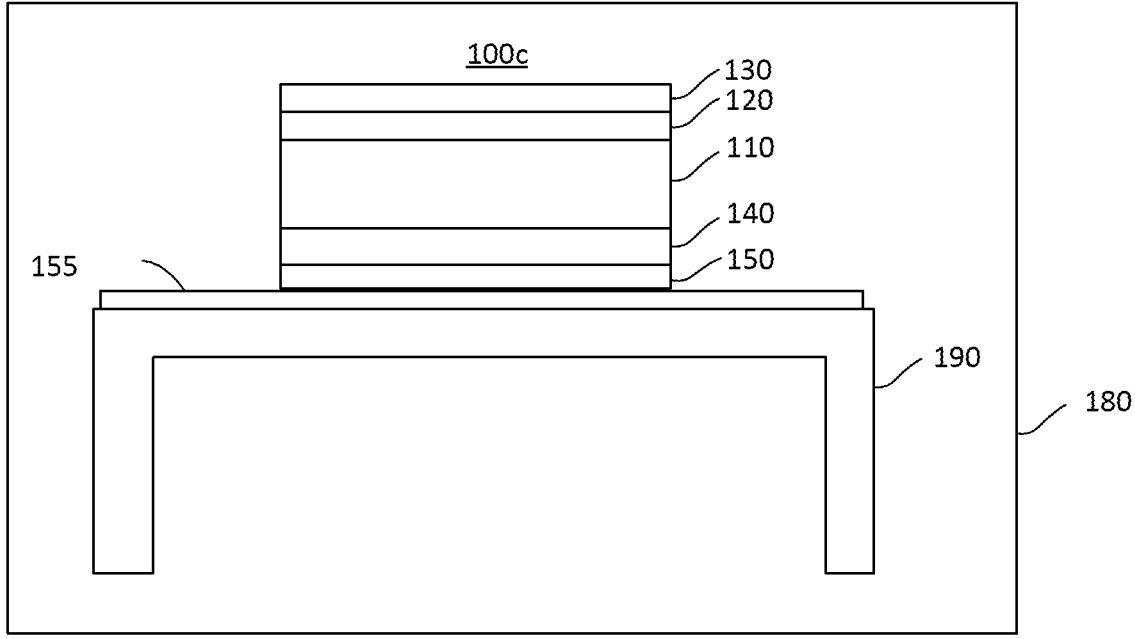
FIG. 3B is a schematic representation of a PCFC anode-electrolyte half-cell on kiln furniture inside a sintering kiln during the SSRS process with a layer of coarse NiO paste applied to the kiln furniture and a coarse NiO layer applied to the half-cell.

In some embodiments, a coarse layer of nickel oxide may be applied both to the anode-electrolyte half-cell 100c and to the kiln furniture 190. FIG. 3B shows the arrangement of a half-cell 100c with a coarse NiO layer 150 in a sintering kiln 180 with a layer of coarse NiO paste 155 applied to the kiln furniture 190. As in the embodiments described above, the NiO can be brushed off the kiln furniture 190 and the half-cell 100c, or may be brushed off the kiln furniture 190 and remain on the half-cell 100c, where it will be reduced to nickel metal during PCFC operation.

Figure 3C:
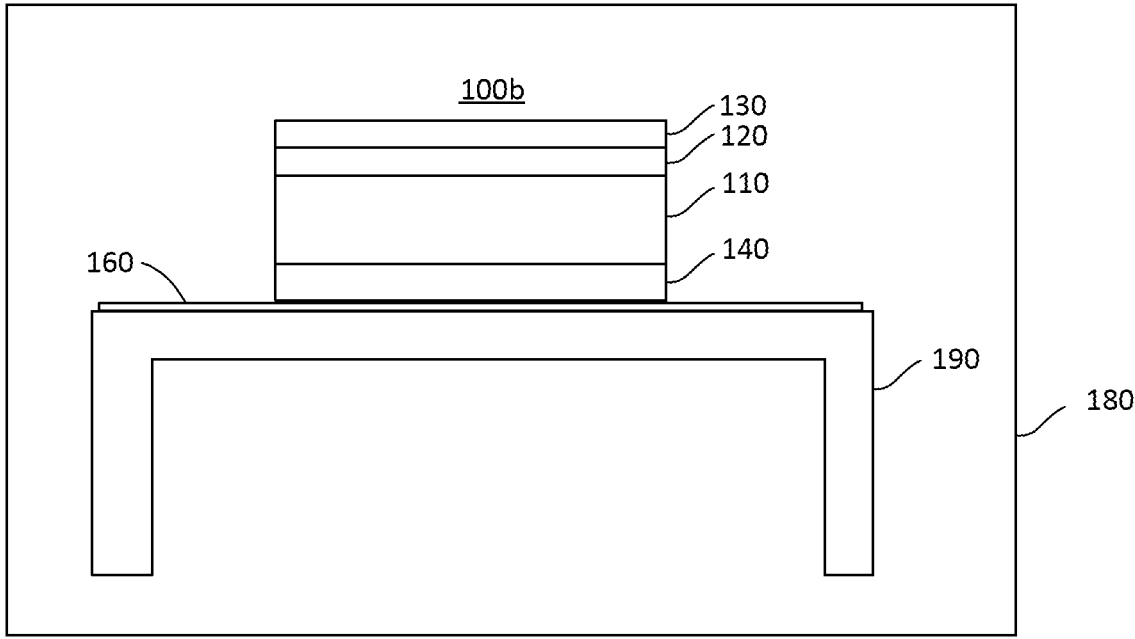
FIG. 3C is a schematic representation of a PCFC anode-electrolyte half-cell on kiln furniture inside a sintering kiln during the SSRS process with a sheet of yttria paper between the half-cell and the kiln furniture.

In other exemplary embodiments, as shown in FIG. 3C, the PCFC anode-electrolyte half-cell 100b is sintered without the use of a coarse NiO layer on either the half-cell or the kiln furniture. Instead, yttria paper 160 is placed between the half-cell 100b and the kiln furniture 190 to prevent them from reacting with and bonding to each other. The yttria paper 160 may be reused for sintering multiple cells before needing to be replaced due to degradation.

Various embodiments include using yttria paper 160 or a coarse NiO layer 150, 155 between the PCFC materials and the kiln furniture 190 without the use of a stress balancing layer 140. Button cells may be produced with this method, and future development in PCFC fabrication may obviate the need for a stress balancing layer 140.

Example

Figure 4A:
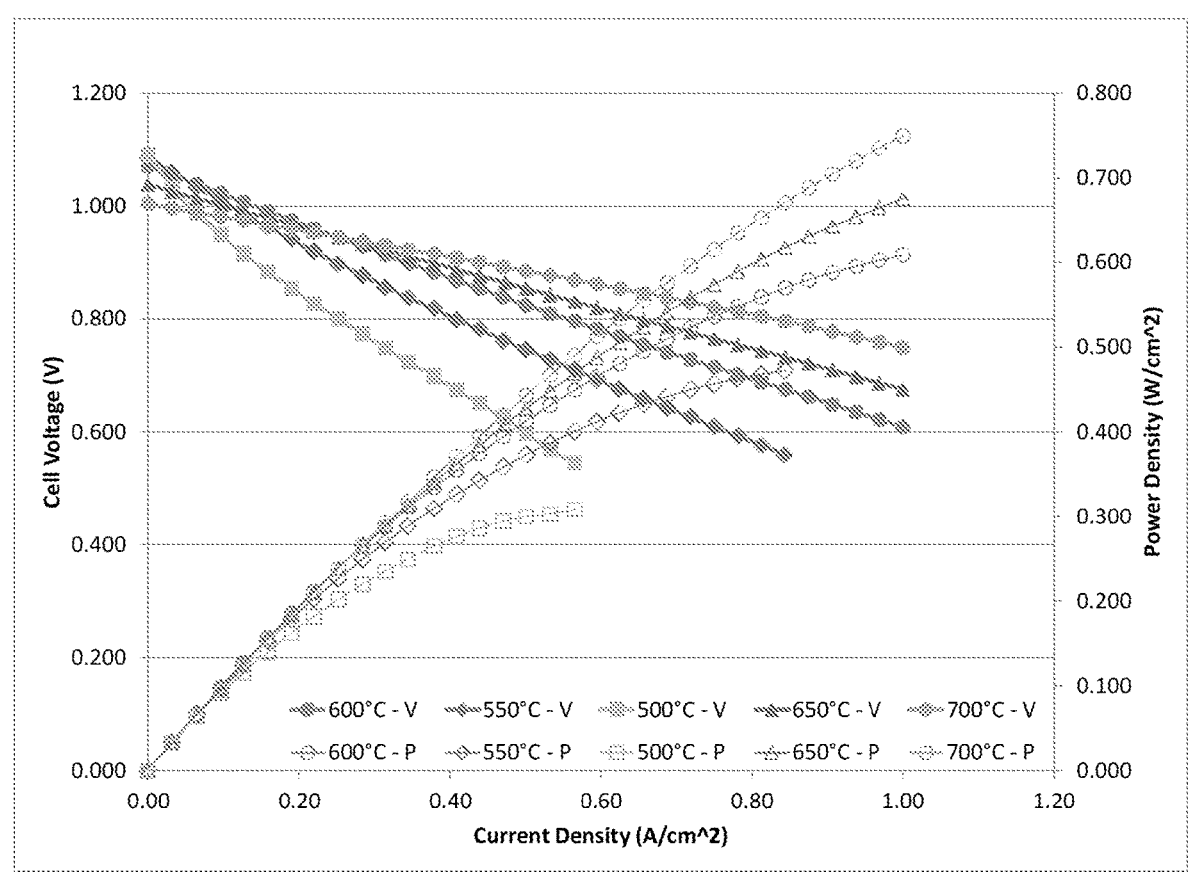
FIG. 4A is a graph of voltage and power density readings at various current densities and temperatures of a first test PCFC containing a stress balancing layer and sintered with a coarse layer of NiO on the kiln furniture, according to an embodiment of the invention.
Figure 4B:
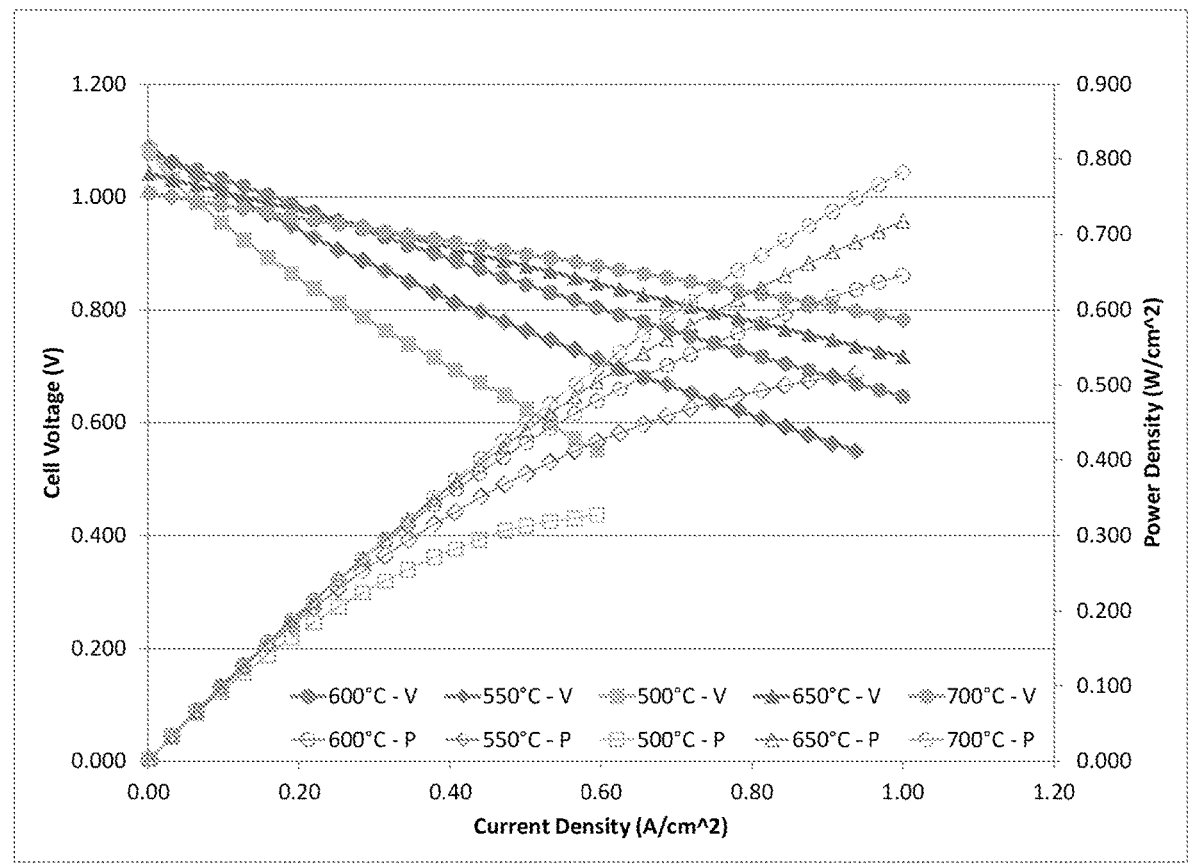
FIG. 4B is a graph of voltage and power density readings during a repeat test at various current densities and temperatures of the first PCFC containing a stress balancing layer and sintered with a coarse layer of NiO on the kiln furniture, according to an embodiment of the invention.
Figure 6A:
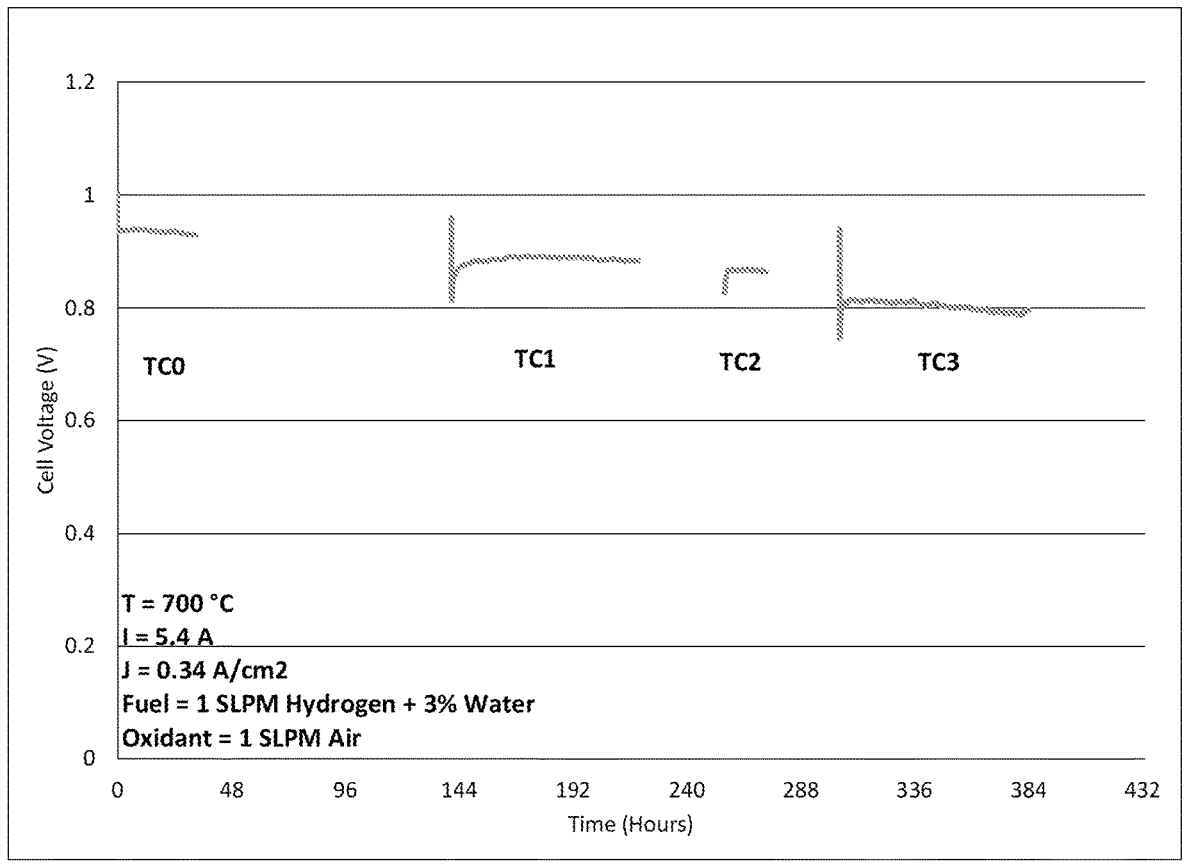
FIG. 6A is a graph of steady-state voltage readings at 700° C. and 0.34 A/cm$^2$ of the first test PCFC containing a stress balancing layer and sintered with a coarse layer of NiO on the kiln furniture, according to an embodiment of the invention.

A first test cell with an active electrode area of 81 cm' was produced in which a layer of coarse NiO paste was applied to the kiln furniture prior to sintering. Voltage and power density were measured during a first test at various operating temperatures and current densities, and the measurements are shown in FIG. 4A. FIG. 4B shows the results from a repeat test performed with the same cell. Operating at 550 degrees Celsius (a relatively low temperature for most fuel cells of this type) the PCFC had a peak power density of approximately 521 mW/cm$^2$. FIG. 6A shows the results of a steady-state hold test of the first test cell. The cell was held at a temperature of 700 degrees Celsius and a current density of 0.34 A/cm$^2$ while voltage was measured over an extended duration. The cell voltage measured between about 0.80V and 0.93V over the course of about 400 hours.

Figure 4C:
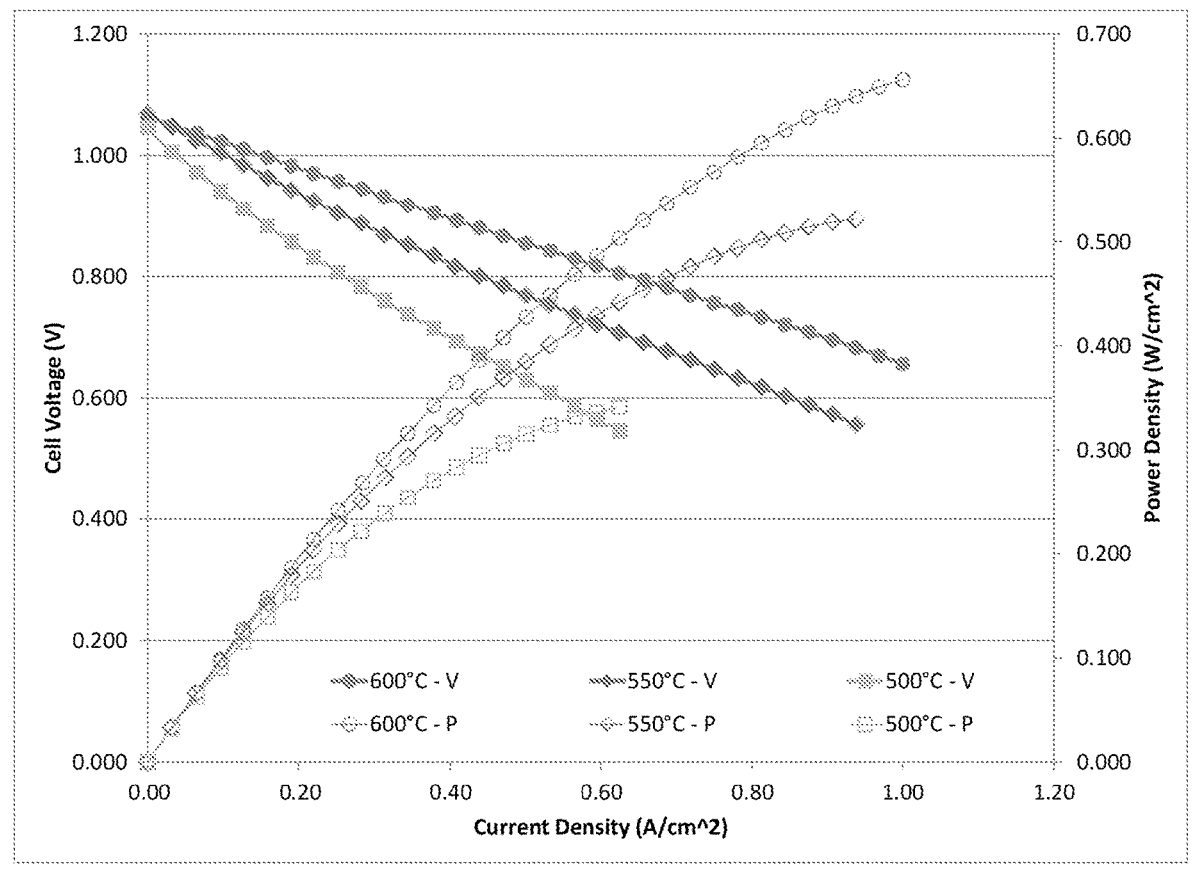
FIG. 4C is a graph of voltage and power density readings at various current densities and temperatures of a second test PCFC containing a stress balancing layer and sintered with a layer of yttria paper between the half-cell and kiln furniture, according to an embodiment of the invention.
Figure 6B:
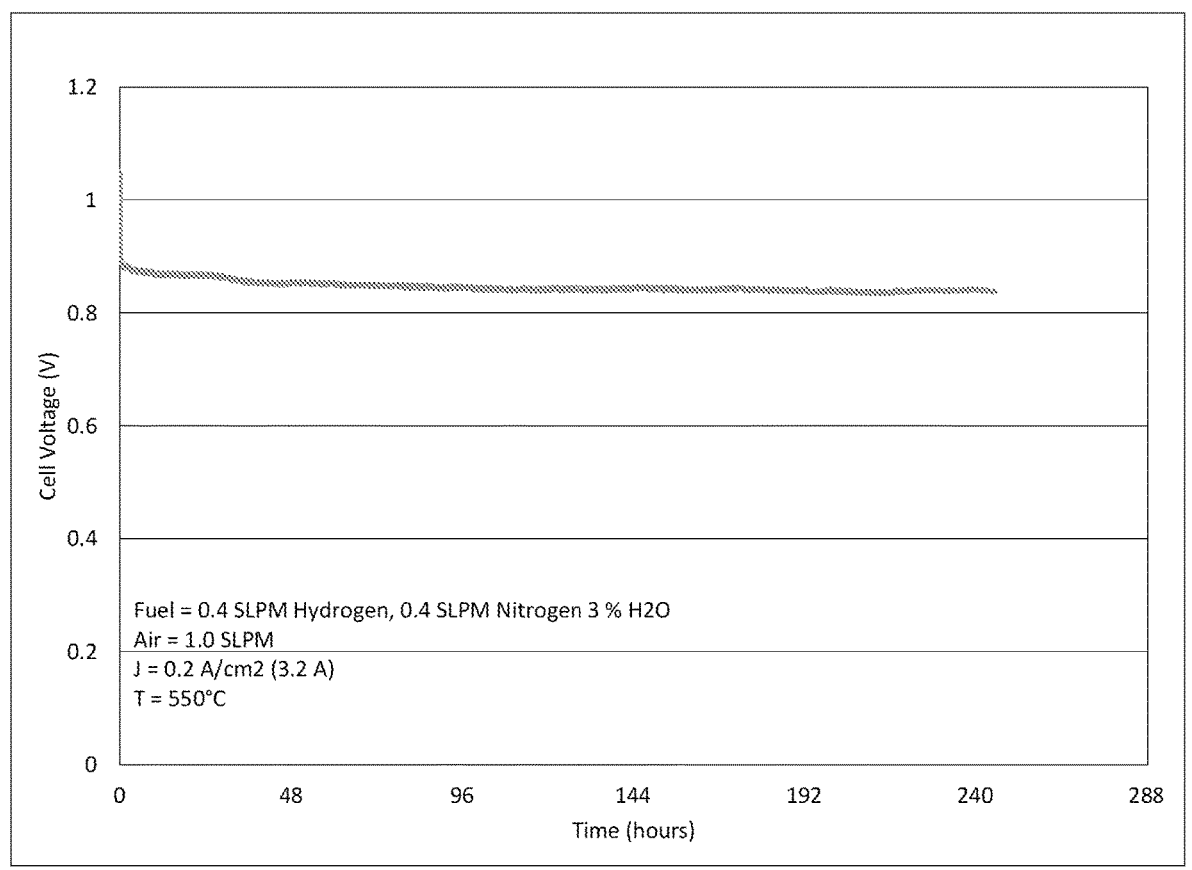
FIG. 6B is a graph of steady-state voltage readings at 550° C. and 0.2 A/cm$^2$ of the second test PCFC containing a stress balancing layer and sintered with a layer of yttria paper between the half-cell and kiln furniture, according to an embodiment of the invention.

A second test cell with an active electrode area of 81 cm$^2$ was produced according to an embodiment of the invention in which yttria paper is placed between the half-cell and kiln furniture during sintering. Voltage and power density of the second test cell were measured at various operating temperatures and current densities, and the measurements are shown in FIG. 4C. At 550 degrees Celsius, the second test cell performed as well as the first, also reaching a peak power density of about 521 mW/cm$^2$. FIG. 6B shows the results of a steady-state hold test performed on the second test cell at a temperature of 550 degrees Celsius and a current density of 0.2 A/cm$^2$. The cell voltage measured between about 0.89V and 0.84V over the course of about 250 hours.

Figure 5:
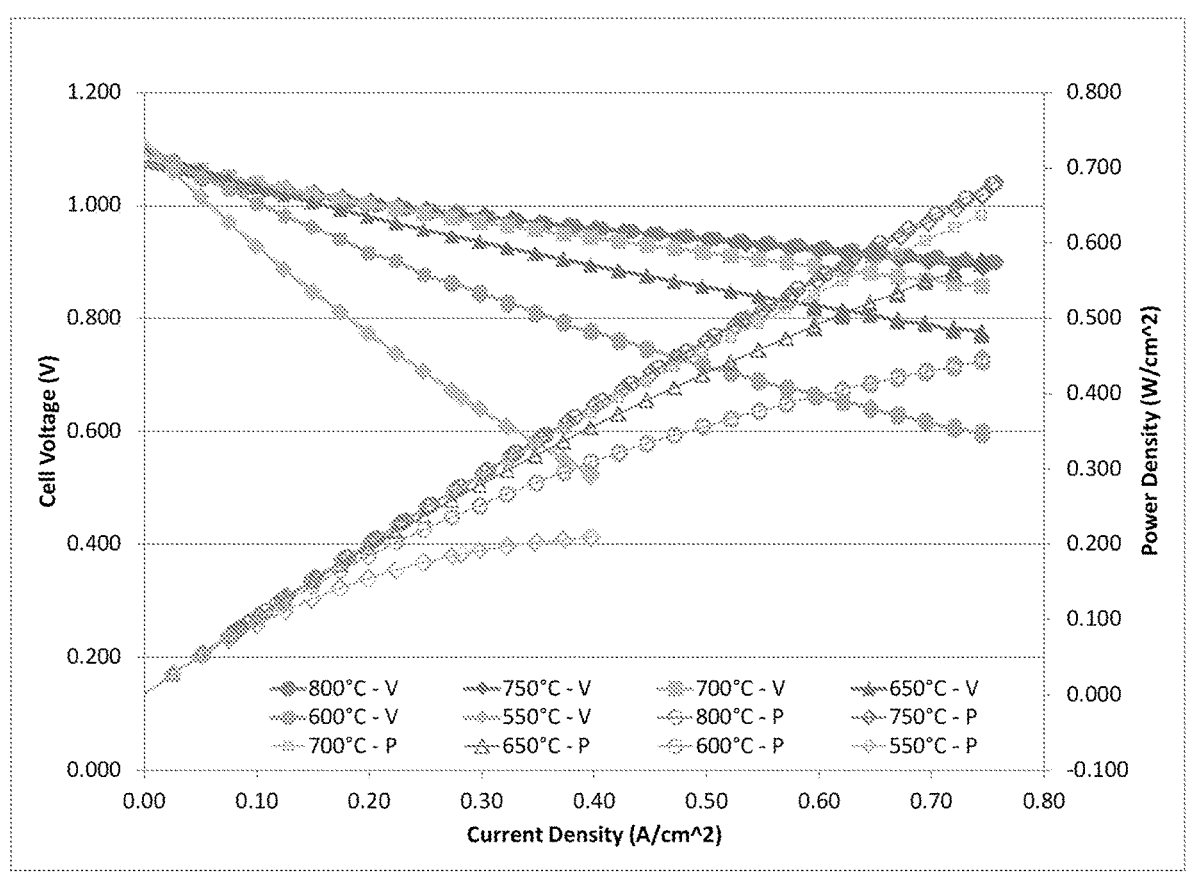
FIG. 5 is a graph of voltage and power density readings at various current densities and temperatures of a solid oxide fuel cell not manufactured according to an embodiment of the invention, shown for comparison to the embodiments of the invention.
Figure 7:
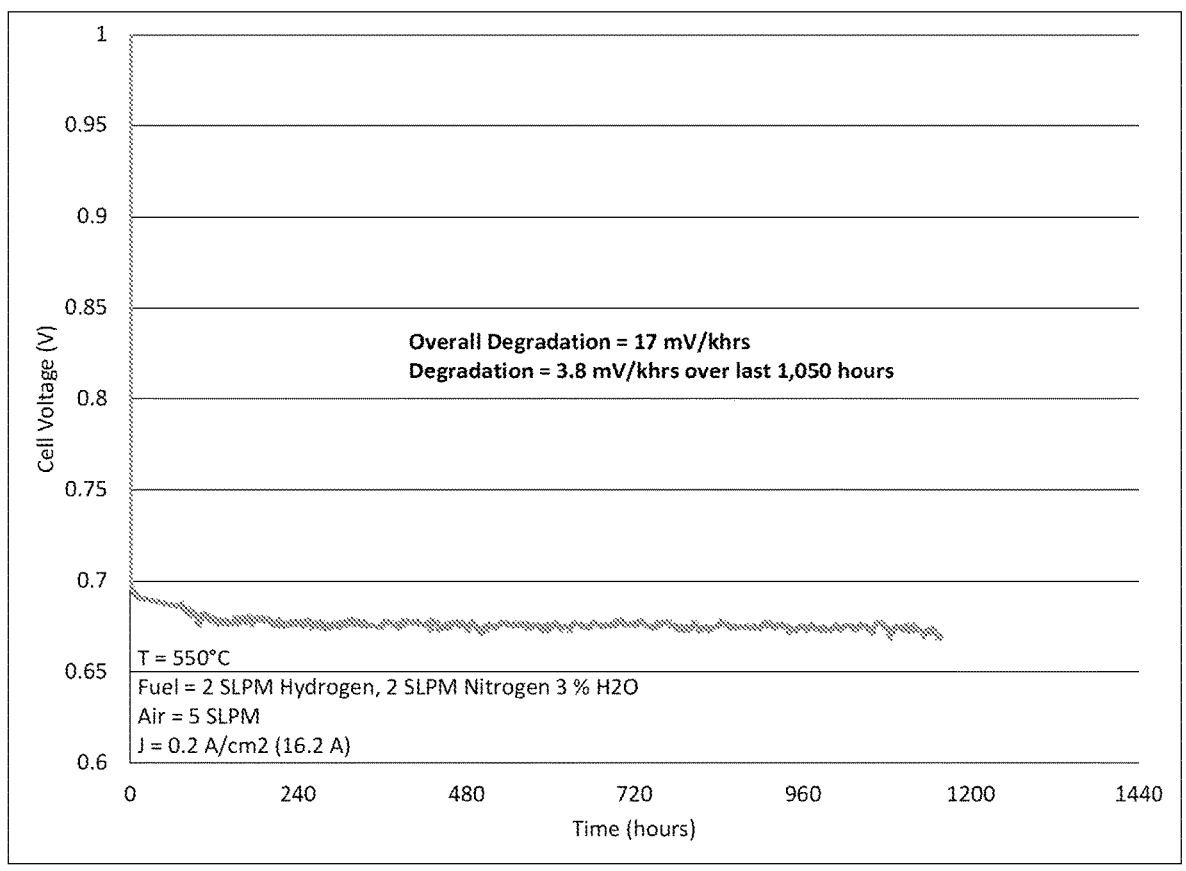
FIG. 7 is a graph of steady-state voltage readings at 550° C. and 0.2 A/cm$^2$ of a of a solid oxide fuel cell not manufactured according to an embodiment of the invention, shown for comparison to the embodiments of the invention.

A solid oxide fuel cell, not according to an embodiment of this disclosure, was tested under similar conditions for comparison to the PCFC test cells. Voltage and power density were measured during a first test at various operating temperatures and current densities, and the measurements are shown in FIG. 5. The solid oxide fuel cell had a peak power density at 550 degrees Celsius of only about 200 mW/cm$^2$, less than half that of the PCFC test cells produced according to the embodiments of the invention. FIG. 7 shows the results of a steady-state hold test performed on the solid oxide fuel cell. The solid oxide fuel cell voltage measured between about 0.70V and 0.67V over the course of about 1100 hours, more than lower than the second PCFC test cell tested at the same temperature and current density (i.e., 550 degrees Celsius and 0.2 A/cm$^2$). The test data shows that the PCFC cells produced according to embodiments of the present application outperform solid oxide fuel cells at the relatively low temperature of 550 degrees Celsius.

Notwithstanding the embodiments described above in FIGS. 1-12, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

References herein to the positions of elements (e.g., "top," "bottom," "in front," "behind," "above," "below") are merely used to describe the orientation of various elements in the FIGURES. It should be noted that the orientation of various elements may differ according to other exemplary embodiments, and that such variations are intended to be encompassed by the present disclosure.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent. Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. A method of manufacturing a proton-conducting fuel cell (PCFC), the method comprising:
    assembling a green anode-electrolyte half-cell comprising:
        an electrolyte layer;
        an anode functional layer adjacent the electrolyte layer;
        an anode substrate layer adjacent the anode functional layer; and
        a stress balancing layer adjacent the anode substrate layer; and
    sintering the green anode-electrolyte half-cell using solid state reaction sintering to form an anode-electrolyte half-cell.

2. The method of claim 1, wherein the anode functional layer comprises nickel oxide, at least one of barium oxide or barium carbonate, and at least one of zirconium oxide or zirconium carbonate.

3. The method of claim 2, wherein the stress balancing layer is made from the same materials as the anode functional layer.

4. The method of claim 2, wherein the anode substrate layer comprises nickel oxide, at least one of barium oxide or barium carbonate, and at least one of zirconium oxide or zirconium carbonate.

5. The method of claim 4, wherein the electrolyte layer comprises at least one of barium oxide or barium carbonate, and at least one of zirconium oxide or zirconium carbonate.

6. The method of claim 5, wherein the anode substrate layer has a thickness of between about 0.2 millimeters and about 2.0 millimeters, wherein the anode functional layer has a thickness of between about 5 micrometers and about 50 micrometers, wherein the electrolyte layer has a thickness of between about 5 micrometers and about 50 micrometers, and wherein the stress balancing layer has approximately the same thickness as the anode functional layer.

7. The method of claim 1, further comprising:
    forming a cathode layer on a surface of the electrolyte layer after sintering the green anode-electrolyte half-cell; and
    cathode sintering the anode-electrolyte half-cell and the cathode layer.

8. The method of claim 1, wherein assembling of the green anode-electrolyte half-cell further comprises forming a coarse NiO layer on a surface of the stress balancing layer, the coarse NiO layer comprising NiO powder with an average particle size above about 20 micrometers and below about 2.0 millimeters.

9. The method of claim 1 further comprising:
    forming a layer of coarse NiO paste on kiln furniture in a sintering kiln; and
    positioning the green anode-electrolyte half-cell on the layer of coarse NiO paste such that the green anode-electrolyte half-cell does not directly contact the kiln furniture, wherein the green anode-electrolyte half-cell is sintered in the sintering kiln.

10. The method of claim 1 further comprising:
    positioning a layer of yttria paper on kiln furniture in a sintering kiln; and
    positioning the green anode-electrolyte half-cell on the layer of yttria paper such that the green anode-electrolyte half-cell does not directly contact the kiln furniture, wherein the green anode-electrolyte half-cell is sintered in the sintering kiln.

11. The method of claim 1, wherein assembling the green anode-electrolyte half-cell comprises:

screen printing, doctor blading, or painting the anode functional layer onto the anode substrate layer;

screen printing, doctor blading, or painting the electrolyte layer onto the anode functional layer; and screen printing, doctor blading, or painting the stress balancing layer onto the anode substrate layer.

12. A proton-conducting fuel cell comprising:

an electrolyte layer;

an anode functional layer adjacent the electrolyte layer;

an anode substrate layer adjacent the anode functional layer;

a stress balancing layer adjacent the anode substrate layer; and a coarse NiO layer adjacent the stress balancing layer, the coarse NiO layer comprising NiO powder with an average particle size above about 20 micrometers and below about 2.0 mm.

13. The proton-conducting fuel cell of claim 12, wherein the anode functional layer is a ceramic made from a base material comprising nickel oxide, at least one of barium oxide or barium carbonate, and at least one of zirconium oxide or zirconium carbonate.

14. The proton-conducting fuel cell of claim 13, wherein the stress balancing layer is a ceramic made from the same base materials as the anode functional layer.

15. The proton-conducting fuel cell of claim 13, wherein the anode substrate layer is a ceramic made from a base material comprising nickel oxide, at least one of barium oxide or barium carbonate, and at least one of zirconium oxide or zirconium carbonate.

16. The proton-conducting fuel cell of claim 15, wherein the electrolyte layer is a ceramic made from a base material comprising at least one of barium oxide or barium carbonate, and at least one of zirconium oxide or zirconium carbonate.

17. The proton-conducting fuel cell of claim 16, wherein the anode substrate layer has a thickness of between about 0.2 millimeters and 2.0 millimeters, wherein the anode functional layer has a thickness of between about 5 micrometers and about 50 micrometers, wherein the electrolyte layer has a thickness of between about 5 micrometers and about 50 micrometers, and wherein the stress balancing layer has approximately the same thickness as the anode functional layer.

18. The proton-conducting fuel cell of claim 12, further comprising a cathode layer coupled to the electrolyte layer.

19. A proton-conducting fuel cell comprising:

an electrolyte layer;

an anode functional layer adjacent the electrolyte layer;

an anode substrate layer adjacent the anode functional layer; and a coarse NiO layer adjacent the anode substrate layer, the coarse NiO layer comprising NiO powder with an average particle size above about 20 micrometers and below about 2.0 mm.

20. The proton-conducting fuel cell of claim 19, wherein the anode substrate layer comprises nickel oxide, at least one of barium oxide or barium carbonate, and at least one of zirconium oxide or zirconium carbonate.

* * * * *